March 21, 1939.   M. G. ROBINSON   2,151,565

REFRIGERATING MACHINE

Filed May 5, 1938

Inventor:
Manuel G. Robinson,
by Harry E. Dunham
His Attorney.

UNITED STATES PATENT OFFICE 2,151,565

REFRIGERATING MACHINE

Manuel G. Robinson, Glen Ridge, N. J., assignor to General Electric Company, a corporation of New York Application May 5, 1938, Serial No. 206,140

11 Claims. (Cl. 62—115)

My invention relates to refrigerating machines of the compression type.

It is an object of my invention to provide a refrigerating machine of the compression type having a compact casing arrangement which may be readily assembled and which is economical to manufacture.

Another object of my invention is to provide a refrigerating machine including a casing having an improved arrangement including a cover for supporting a compressor and driving motor therefor.

Further objects and advantages of my invention will become apparent as the following description proceeds and the features of novelty which characterize my invention will be pointed out with particularity in the claims annexed to and forming a part of this specification.

Figure 1:
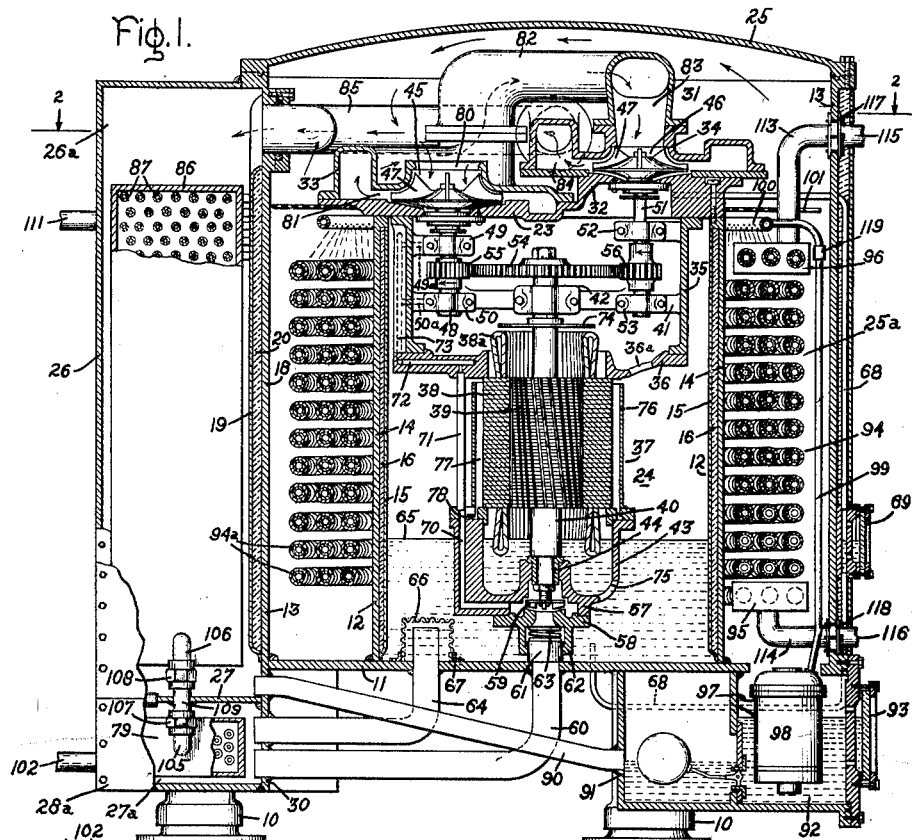
Figure 2:
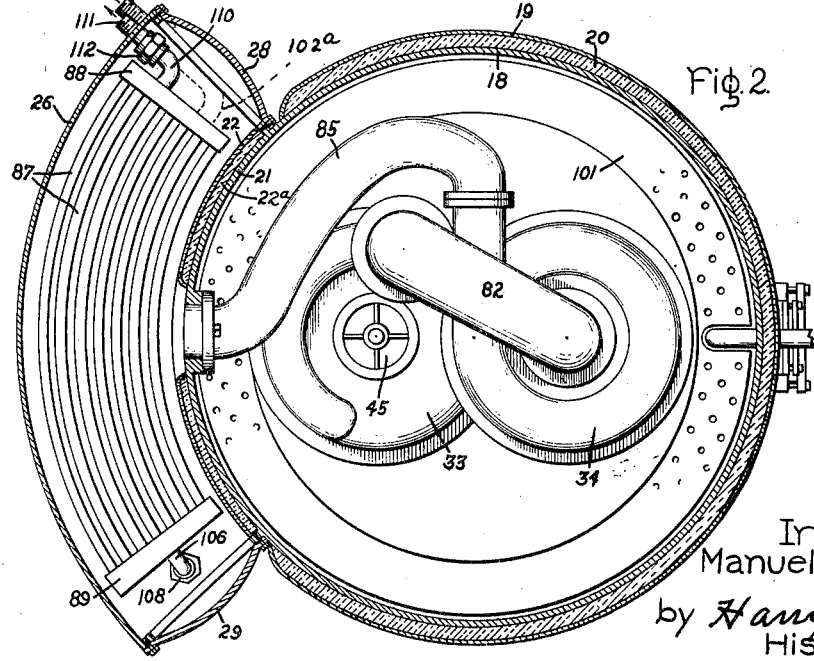

For a better understanding of my invention, reference may be had to the drawing, in which Fig. 1 is a vertical view partly in section of a refrigerating machine embodying my invention and Fig. 2 is a horizontal view partly in section taken along the line 2—2 of Fig. 1 of the refrigerating machine.

Referring to the drawing, I have shown a refrigerating machine having a compact and convenient arrangement of parts. I have provided an inner casing defining a motor compartment 24. The upper portion of the motor compartment is closed by a compressor 31 which is driven from the motor 37 suitably arranged in the lower portion of the motor compartment. The lower portion of the motor compartment 24 also serves as a lubricant reservoir, the lubricant being used to cool the motor 37 as well as lubricate the driving connection between the motor 37 and the compressor 31. A second casing 13 surrounds the motor compartment and defines an evaporator compartment 25a. A third casing 26 is provided concentric with respect to the first two mentioned compartments or casings but extending around a portion only of the circumference of the evaporator and motor compartments. The condenser compartment is divided into two portions 26a and 27a serving to condense the refrigerant vapor received from the compressor and to cool the lubricant from the motor compartment respectively. While the embodiment of my invention described herein is illustrated in connection with a two-stage compressor, I wish it to be understood that my invention is not limited to a multi-stage compressor but one or more stages as desired may be employed.

Describing my invention in detail, I have shown a refrigerating machine supported by a plurality of spaced-apart feet 10 having a casing arrangement including a bottom wall 11, an upstanding side wall 12 and an upstanding side wall 13 surrounding the side wall 12 in spaced relation thereto and secured to the bottom wall 11. The side wall 12 comprises two concentrically arranged cylindrical members 14 and 15 secured to the bottom wall 11 and separated by a layer of heat insulation 16. The upstanding side wall 13 through approximately three-fourths of its circumferential distance comprises two concentrically arranged members 18 and 19 secured to the bottom wall 11 and separated by a layer of heat insulation 20. Over the remaining portion of the circumferential distance of the upstanding side wall 13 the side wall comprises two spaced-apart arcuately shaped members 21 and 22, member 21 being the continuation of member 18. A layer of heat insulation 22a is arranged between members 21 and 22.

A cover 23 is removably secured to the upper end of the side wall 12 and cooperates with the side wall 12 and the bottom wall 11 to provide an upstanding tubular inner casing defining a motor compartment 24 therein. A cover 25 is removably secured to the upper end of the side wall 13 and cooperates with the side wall 13 and bottom wall 11 to provide an upstanding tubular outer casing surrounding the tubular inner casing defining an evaporator compartment 25a and providing space for a centrifugal compressor 31 therein. An arcuate shell 26 is arranged concentrically with upstanding side wall 13. This shell 26 is divided by partition 27 into two compartments 26a and 27a respectively. The upper compartment 26a of the shell 26 cooperates with upstanding side wall 13 and end plates 28 and 29 which are removably secured between shell 26 and upstanding side wall 13 to define a condenser compartment. The lower compartment 27a of shell 26 cooperates with depending portion 30 of cylindrical member 18 of upstanding side wall 13 and end plates 28a and 29a, not shown, to define a lubricant cooling compartment.

The cover 23 constitutes a section of the casing of a multi-stage centrifugal compressor 31 and provides a diffuser plate for the centrifugal compressor. In the embodiment of my invention illustrated in the drawing I have shown a two-stage centrifugal compressor. Cover 23 is provided with a step portion 32 in order to allow the two stages to overlap thus decreasing the required center distance and over-all diameter of the machine. The centrifugal compressor 31 is also provided with complementary casing sections 33 and 34 secured to the cover 23 in any suitable manner.

A bracket 35 secured to the lower surface of the cover 23 depends therefrom into the motor compartment 24. A plate 36 secured to the lower portion of the bracket 35 carries a motor 37 which is preferably of the induction type and includes a stator 38 having a winding 38a and a rotor 39 mounted on a vertically disposed shaft 40. The bracket 35 is provided with a flange structure 41 which carries the upper bearing 42 for the vertically disposed shaft 40. The motor 37 is provided with a lower end shield 43 which carries a lower thrust bearing 44 for the shaft 40.

The centrifugal compressor 31 is of the two-stage type having a first stage impeller 45 and a second stage impeller 46. Each impeller has a plurality of spaced-apart blades 47 arranged between the cover 23 and the corresponding casing section. The first stage impeller 45 is mounted on a verticaly disposed shaft 48 which is journaled in upper and lower bearings 49 and 50, the upper and lower bearings being carried by the flange structure 41 of the bracket 35. The second stage impeller 46 is mounted on a vertically disposed shaft 51 journaled in upper and lower bearings 52 and 53, the upper and lower bearings 52 and 53 being carried by the flange structure 41 of the bracket 35. A driving connection including a relatively large gear 54 on the motor shaft 40 and relatively small pinions 55 and 56 mounted on shafts 48 and 51 respectively is provided between shaft 40 and shafts 48 and 51 respectively. Shafts 48 and 51 project through openings provided in the cover 23 and are provided with suitable sealing means.

The end shield 43 of the motor 37 is provided with a downwardly extending annular flange 57 which cooperates with a plate 58 secured thereto to provide a lubricant pump casing. The lower end of shaft 40 projects into the lubricant pump casing and carries an impeller 59. An opening is provided through plate 58 in alignment with the impeller 59 and a lubricant conduit 60. A slip joint 61 is provided between the conduit 60 and a flange 62 depending from the plate 58. A spring 63 is utilized to yieldingly maintain the flange 62 and slip joint 61 in communicating relationship with conduit 60.

The lower portion of the motor compartment 24 constitutes a lubricant reservoir containing a body of lubricant 65 which submerges the lubricant pump casing and the lower end turns of the winding 38a of the motor 37. A lubricant outlet 64 projects into the lower portion of the lubricant reservoir and is surrounded by a cup-shaped reticulated screen 66 secured to the bottom wall 11 by an annular ring 67. A conduit 68 extending between the lower portion of the lubricant reservoir and the upper portion of compartment 24 passes upwardly through outer upstanding side wall 13. A sight gauge 69 is arranged in conjunction with conduit 68 and side wall 13 to provide means to determine the lubricant level within the lubricant reservoir.

During operation of the refrigerating machine lubricant is drawn through the inlet conduit 60 into the lubricant pump casing by the impeller 59. The lubricant is discharged from the lubricant pump casing through passage 70 formed in the lower end shield 43 of the motor 37, conduit 71, passage 72 in the plate 36 and passage 73 formed in the flange structure 41 of the bracket 35. The lubricant is conducted from the passage 73 to the bearings 49 and 50 through passages 49a and 50a respectively, in order to lubricate these bearings. Bearings 42, 52 and 53 are lubricated in a manner similar to that described in connection with bearings 49 and 50 by means by suitable passages not shown. Excess lubricant escaping from the upper bearings 49 and 52 is conducted along the shafts 48 and 51 respectively to the pinions 55 and 56 respectively in order to lubricate the pinions and the gear 54 in mesh therewith. The excess lubricant escaping from the lower bearings 50 and 53 is caught in the plate 36 and the excess lubricant escaping from the bearing 42 is thrown from the shaft 40 by the deflector shield 74 carried by the shaft 40 into the plate 36. The lubricant accumulating in the plate 36 flows therefrom through an opening 36a into the motor compartment 24 and to the liquid reservoir in the lower portion thereof. The interior of the lower end shield 43 communicates with the body of lubricant in the lubricant reservoir through an opening 75 in the end shield 43. The lower thrust bearing 44 is adequately lubricated due to the fact that it is submerged in the body of lubricant 65 contained in the lubricant reservoir. In order to adequately cool the motor 37, the stator 38 is surrounded by a cylindrical tubular casing 76 supported upon the lower end shield 43 of the motor 37 so as to define a space 77 between the casing 76 and the stator 38. A passage 78 joins the lower end of space 77 and passage 70 in the end shield 43. A portion of the lubricant which is being pumped through passage 70 discharges from passage 78 into space 77 and passes upwardly across the laminations of the stator 38. The excess lubricant flows over the top of casing 76 and down the side of casing 76 into the body of lubricant in the lubricant reservoir.

In order to cool the lubricant a heat exchanger 79 is arranged in the lower compartment 27a of casing 26. Lubricant from the body of lubricant in the lubricant reservoir passes through the reticulated screen 66, which prevents foreign matter from entering the conduit 64, and the conduit 64 into the compartment 27a where it circulates across the tubes of the heat exchanger. The cooled lubricant is withdrawn from compartment 27a into the pump through the conduit 60.

The compressor casing section 33 is provided with an annular opening 80 aligned with impeller 45 of the first stage of the centrifugal compressor and a discharge opening 81 between cover 23 and casing section 33. The discharge opening 81 is joined by conduit 82 to a second annular inlet opening 83 in the casing 34 aligned with the impeller 46 of the second stage of the centrifugal compressor. A discharge opening 84 between cover 23 and casing section 34 communicates with condenser compartment 26a through conduit 85.

The refrigerating machine is charged with a refrigerant having a relatively low vapor pressure such as tri-chlorethylene, for example, in order that the refrigerant may be adequately compressed by the centrifugal compressor 31. During operation of the refrigerating machine vaporized refrigerant in the evaporator compartment 25a is withdrawn therefrom through the annular inlet opening 80 in the casing section 33 of the centrifugal compressor 31 by the impeller 45. The vaporized refrigerant is compressed and discharged through the discharge opening 81 into the conduit 82. This partially compressed refrigerant is drawn through annular inlet opening 83 in the casing section 34 of the centrifugal compressor 31 by the impeller 46 and compressed still further. The compressed refrigerant is discharged to the condenser compartment 26a through conduit 85 to be liquefied. An arrangement including a heat exchanger 86 is provided for liquefying the compressed regrigerant in the condenser compartment 26a. The heat exchanger 86 comprises a plurality of spaced-apart arcuately-shaped tubes 87 connected at opposite ends by two spaced-apart headers 88 and 89. Compressed refrigerant is liquefied in the condenser compartment 26a and liquid refrigerant is conducted from the lower portion thereof through a conduit 90 to a float-operated flow-controlling device 91. The liquefied refrigerant is conducted from the float-operated flow-controlling device 91 into the lower portion of a liquid refrigerant sump 92 in the lower portion of the evaporator compartment 25a. The float-operated flow-controlling device is arranged to admit liquid refrigerant into the liquid refrigerant sump 92 when a predetermined level of liquid refrigerant is contained in the casing of the float-operated flow-controlling device 91. A sight gauge 93 is provided to indicate the level of the refrigerant within the liquid refrigerant sump.

A heat exchanger 94 comprising a plurality of spaced-apart helically disposed tubes 94a interconnected at opposite ends by spaced-apart headers 95 and 96 is arranged in the evaporator compartment 25a to be cooled by the refrigerant therein. The tubes comprising the helices are provided with fins to increase the heat exchange surface.

The wall between the float-operated flow-controlling device 91 and the liquid refrigerant sump 92 is provided with a bracket 97 which supports a liquid circulating pump 98 in the liquid refrigerant sump. The liquid circulating pump draws liquid refrigerant from the sump 92 and discharges the refrigerant through an upwardly directed conduit 99 into a header 100 disposed above the upper portion of the heat exchanger 94. The header 100 is perforated along its length in order to discharge liquid refrigerant in the form of a spray upon the tubes of the heat exchanger 94. The liquid refrigerant flows over the outer surfaces and the fins of the tubes and is returned to the liquid refrigerant sump 92. The liquid refrigerant circulating pump 98 is arranged to discharge a greater quantity of liquid refrigerant over the outer surfaces of the tubes and the fins of the heat exchanger 94 than is evaporated thereby in order to provide for recirculation of the liquid refrigerant and to insure that the outer surfaces of the tubes and the fins will be completely wetted with a film of liquid refrigerant. A baffle 101 secured to plate 23 is provided to prevent any of the spray or drops of liquid refrigerant from being drawn into the compressor casing.

The heat exchanger 79 in the lubricant cooling compartment 27a has a cooling medium inlet connection 102 connected to an inlet conduit 102a by a flanged coupling (not shown). The heat exchanger 79 is provided with an outlet connection 105 which is connected to the inlet conduit 106 of the heat exchanger 86 in the condenser compartment 26a through flanged couplings 107 and 108 and conduit 109. The heat exchange coil 86 is provided with an outlet connection 110 connected to an outlet conduit 111 through a flanged coupling 112. The flanged couplings are used to permit ready removal of the heat exchangers. It will be apparent that the heat exchange coils are connected in series and during operation the cooling liquid supply flows through the lubricant cooling heat exchanger and then through the main condenser.

The heat exchanger 94 in the evaporator compartment 25a is provided with an inlet connection 113 for a medium to be cooled and an outlet connection 114 which are connected respectively to an inlet conduit 115 and an outlet conduit 116 by suitable sealing means 117 and 118 respectively. During operation of the refrigerating machine, the medium to be cooled is conducted from the inlet conduit 115 through the heat exchanger 94 into the outlet conduit 116. The cooling medium is then conducted from the outlet conduit to any suitable heat exchanging device utilizing the refrigeration produced by the machine described.

The refrigerating machine is assembled in the following manner. The heat exchanger 86 is arranged within the condenser compartment 26a and the inlet and outlet connections 106 and 110 are connected respectively to the flanged couplings 108 and 112. The heat exchanger 79 is arranged within the lubricant cooling compartment 27a and the inlet and outlet connections are connected to the respective flanged couplings and conduit 109 is connected between couplings 107 and 108. Cover plates 28, 29, 28a and 29a are next secured in position. The liquid circulating pump 98 is arranged in the refrigerant sump 92 by means of bracket 97. The heat exchanger 94 is arranged within the evaporator 25a and the inlet and outlet conduits 115 and 116 are connected respectively to the inlet and outlet connections 113 and 114 through the sealing means 117 and 118. The perforated header 100 is arranged in position above the heat exchanger 94 by means of a coupling 119 and conduit 99. The assembled cover 23, centrifugal compressor 31, baffle plate 101 and motor 37 are then placed in position on upstanding side wall 12 of the inner casing. Conduits 85 and 82 are next secured in position as illustrated in the drawing. Finally, cover 25 is secured on the side wall 13.

From the foregoing description of the refrigerating machine, it is apparent that the compressor and motor may be readily removed from the motor compartment and that the heat exchangers 86, 79 and 94 respectively may be readily removed from the condenser compartment 26a, lubricant cooling compartment 27a and the evaporator compartment 25a respectively.

While I have shown a particular embodiment of my invention in connection with a refrigerating machine having a multi-stage compressor of the centrifugal type, I do not desire my invention to be limited to the particular construction shown and described and I intend in the appended claims to cover all modifications within the spirit and scope of my invention.

What I claim as new and desire to secure by Letters Patent of the United States, is:

1. A refrigerating machine comprising an inner casing defining a motor compartment, a motor arranged in said motor compartment, an outer casing surrounding said inner casing and cooperating therewith to define an evaporator compartment, a third casing extending around a portion only of said outer casing in spaced relation thereto and cooperating therewith to define a condenser compartment, means including a multi-staged compressor driven by said motor for withdrawing vaporized refrigerant from said evaporator compartment and for discharging compressed refrigerant into said condenser compartment, means including a heat exchanger arranged in said condenser compartment for liquefying the compressed refrigerant therein, means for conducting liquid refrigerant from said condenser compartment to said evaporator compartment, and a second heat exchanger arranged in said evaporator compartment and cooled by the refrigerant therein.

2. A refrigerating machine comprising an inner casing defining a motor compartment, a motor arranged in said motor compartment, an outer casing surrounding said inner casing and cooperating therewith to define an evaporator compartment, a third casing extending around a portion only of said outer casing in spaced relation thereto and cooperating therewith to define a condenser compartment, means including a multi-staged compressor driven by said motor for withdrawing vaporized refrigerant from said evaporator compartment and for discharging compressed refrigerant into said condenser compartment, means including a heat exchanger arranged in said condenser compartment for liquefying the compressed refrigerant therein, means for conducting liquid refrigerant from said condenser compartment to said evaporator compartment, a second heat exchanger arranged in said evaporator compartment and cooled by the refrigerant therein, and means for recirculating liquid refrigerant in said evaporator compartment over the outer surface of said heat exchanger therein.

3. A refrigerating machine comprising an inner casing defining a motor compartment, a motor arranged in said motor compartment, an outer casing surrounding said inner casing in spaced relation thereto and cooperating therewith to define an evaporator compartment, a third casing extending around a portion only of said outer casing in spaced relation thereto and cooperating therewith to define a condenser compartment, means including a compressor driven by said motor for withdrawing vaporized refrigerant from said evaporator compartment and for discharging compressed refrigerant into said condenser compartment, means including a heat exchanger arranged in said condenser compartment for liquefying the compressed refrigerant therein, means for conducting liquid refrigerant from said condenser compartment to said evaporator compartment, a second heat exchanger arranged in said evaporator compartment and cooled by the refrigerant therein, means including a body of lubricant contained in said motor compartment for cooling said motor arranged therein, and means for cooling the body of lubricant contained in a compartment adjacent said condenser compartment.

4. A refrigerating machine comprising an inner casing having a removable cover and defining a motor compartment, a motor arranged in said motor compartment and carried by said cover, an outer casing surrounding said inner casing and cooperating therewith to define an evaporator compartment, a third casing extending around a portion only of said outer casing in spaced relation thereto and cooperating therewith to define a condenser compartment, means including a multi-staged compressor driven by said motor for withdrawing vaporized refrigerant from said evaporator compartment and for discharging compressed refrigerant into said condenser compartment, means including a heat exchanger arranged in said condenser compartment for liquefying the compressed refrigerant therein, means for conducting liquid refrigerant from said condenser compartment to said evaporator compartment, and a second heat exchanger arranged in said evaporator compartment and cooled by the refrigerant therein.

5. A refrigerating machine comprising an inner casing having a removable cover and defining a motor compartment, a motor arranged in said motor compartment and carried by said cover, an outer casing surrounding said inner casing and cooperating therewith to define an evaporator compartment, a third casing extending around a portion only of said outer casing in spaced relation thereto and cooperating therewith to define a condenser compartment, means including a multi-staged compressor carried by said cover and driven by said motor for withdrawing vaporized refrigerant from said evaporator compartment and for discharging compressed refrigerant into said condenser compartment to be liquefied therein, and means for conducting liquid refrigerant from said condenser compartment to said evaporator compartment.

6. A refrigerating machine comprising an inner casing having a removable cover and defining a motor compartment, a motor arranged in said motor compartment and carried by said cover, an outer casing surrounding said inner casing and cooperating therewith to define an evaporator compartment, a third casing extending around a portion only of said outer casing in spaced relation thereto and cooperating therewith to define a condenser compartment, means including a compressor carried by said cover and driven by said motor for withdrawing vaporized refrigerant from said evaporator compartment and for discharging compressed refrigerant into said condenser compartment to be liquefied therein, means including a body of lubricant contained in said motor compartment for cooling said motor arranged therein, and means for cooling the body of lubricant contained in a compartment adjacent said condenser compartment.

7. A refrigerating machine comprising an inner casing having a removable cover and defining a motor compartment, a motor arranged in said motor compartment and carried by said cover, an outer casing surrounding said inner casing in spaced relation thereto and cooperating therewith to define an evaporator compartment, a third casing extending around a portion only of said outer casing in spaced relation thereto and cooperating therewith to define a condenser compartment, means including a multi-staged compressor carried by said cover and driven by said motor for withdrawing vaporized refrigerant from said evaporator compartment and for discharging compressed refrigerant into said condenser compartment, means including a heat exchanger arranged in said condenser compartment for liquefying the compressed refrigerant therein, means for conducting liquid refrigerant from said condenser compartment to said evaporator compartment, and a second heat exchanger arranged in said evaporator compartment and cooled by the refrigerant therein.

8. A refrigerating machine comprising a tubular inner casing defining a motor compartment, a motor arranged in said motor compartment, a tubular outer casing surrounding said inner casing in spaced relation thereto and cooperating therewith to define an evaporator compartment, a third casing extending around a portion only of said tubular outer casing in spaced relation thereto and cooperating therewith to define a condenser compartment, means including a multi-staged compressor driven by said motor for withdrawing vaporized refrigerant from said evaporator compartment and for discharging compressed refrigerant into said condenser compartment, means including a heat exchanger arranged in said condenser compartment for liquefying the compressed refrigerant therein, means for conducting liquid refrigerant from said condenser compartment to said evaporator compartment, and a second heat exchanger arranged in said evaporator compartment and cooled by the refrigerant therein.

9. A refrigerating machine comprising an upstanding tubular inner casing having a removable cover and defining a motor compartment, a motor arranged in said motor compartment and carried by said cover, an upstanding tubular outer casing surrounding said inner casing in spaced relation thereto and cooperating therewith to define an evaporator compartment, a third casing extending around a portion only of said upstanding tubular outer casing in spaced relation thereto and cooperating therewith to define a condenser compartment, means including a multi-staged compressor carried by said cover and driven by said motor for withdrawing vaporized refrigerant from said evaporator compartment and for discharging compressed refrigerant into said condenser compartment to be liquefied therein, means for conducting liquid refrigerant from said condenser compartment to said evaporator compartment, said outer casing having a removable cover to provide for removal of said cover of said inner casing together with said motor and said compressor carried thereby.

10. A refrigerating machine comprising an upstanding tubular inner casing defining a motor compartment, a motor arranged in said motor compartment, an upstanding tubular outer casing surrounding said inner casing in spaced relation thereto and cooperating therewith to define an evaporator compartment, a third casing extending around a portion only of said upstanding tubular outer casing in spaced relation thereto and cooperating therewith to define a condenser compartment, means including a multi-staged compressor driven by said motor for withdrawing vaporized refrigerant from said evaporator compartment and for discharging compressed refrigerant into said condenser compartment, means including a heat exchanger arranged in said condenser compartment for liquefying the compressed refrigerant therein, means for conducting liquid refrigerant from said condenser compartment to said evaporator compartment, and a second heat exchanger arranged in said evaporator compartment and cooled by the refrigerant therein.

11. A refrigerating machine comprising an upstanding tubular inner casing having a removable cover and defining a motor compartment, a motor arranged in said motor compartment and carried by said cover, an upstanding tubular outer casing surrounding said inner casing in spaced relation thereto and cooperating therewith to define an evaporator compartment, a third casing extending around a portion only of said upstanding tubular outer casing in spaced relation thereto and cooperating therewith to define a condenser compartment, means including a multi-staged compressor carried by said cover and driven by said motor for withdrawing vaporized refrigerant from said evaporator compartment and for discharging compressed refrigerant into said condenser compartment, means including a heat exchanger arranged in said condenser compartment for liquefying the compressed refrigerant therein, means for conducting liquid refrigerant from said condenser compartment to said evaporator compartment, and a second heat exchanger arranged in said evaporator compartment and cooled by the refrigerant therein, said outer casing having a removable cover to provide for removal of said heat exchanger in said evaporator compartment and said cover of said inner casing together with said motor and said compressor carried thereby and said third casing having a removable cover to provide for removal of said heat exchanger in said condenser compartment.

MANUEL G. ROBINSON.